United States Patent [19]

Musser, Jr. et al.

[11] 4,449,616
[45] May 22, 1984

[54] NON-REVERSIBLE BRAKE ADJUSTER

[75] Inventors: Lester W. Musser, Jr., Barberton; Lee A. Germain, Tallmadge, both of Ohio

[73] Assignee: Goodyear Aerospace Corporation, Akron, Ohio

[21] Appl. No.: 99,353

[22] Filed: Dec. 3, 1979

[51] Int. Cl.³ .............................................. F16D 55/02
[52] U.S. Cl. .................................. 188/71.8; 188/196 R
[58] Field of Search ............... 198/1 C, 196 R, 196 P, 198/71.8; 192/111 A; 403/274, 279, 280, 282; 24/505, 525

[56] References Cited

U.S. PATENT DOCUMENTS 4,192,407  3/1980  Crossman ........................ 188/71.8
4,214,650  7/1980  Crossman et al. ................ 188/71.8

*Primary Examiner*—Joseph E. Valenza
*Attorney, Agent, or Firm*—L. A. Germain; P. E. Milliken

[57] ABSTRACT

A brake adjuster, including a pin interconnecting a brake pressure plate at one end and a metal swage at the opposite end and oriented within a deformable tube such as to radially deform the tube to the shape of the swage as the swage moves into the tube bore in response to brake wear, is rendered non-reversible to loading in the reverse direction by a washer mounted on the pin, relative to the swage, and having the circumferential geometric configuration of the tube bore such as to move easily within the bore in the swaging direction but stopped from movement in the opposite direction by the deformed portion of the tube. In alternative embodiments a tube is mounted on the pin or the pin diameter is increased to approximate the bore diameter of the deformable tube. The trailing edges of the tube or the pin adjacent the leading edge of the swage abut the deformed portion of the tube in the reverse direction to prevent motion in that direction.

8 Claims, 8 Drawing Figures

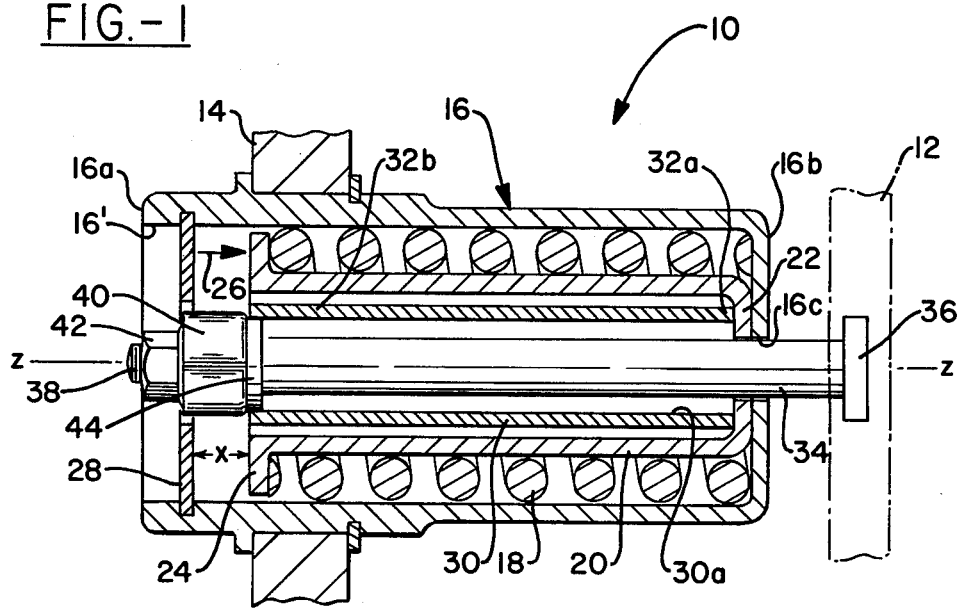
FIG.-1
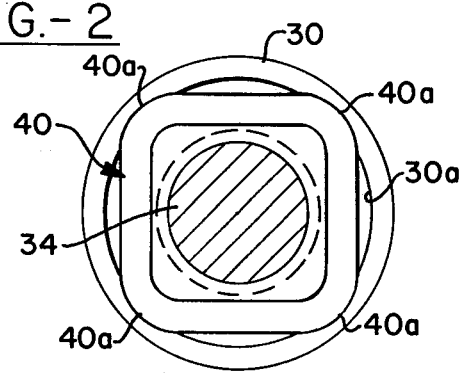
FIG.-2
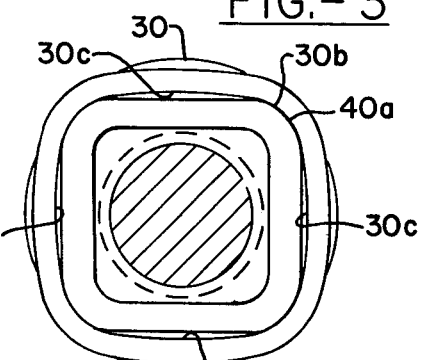
FIG.-3
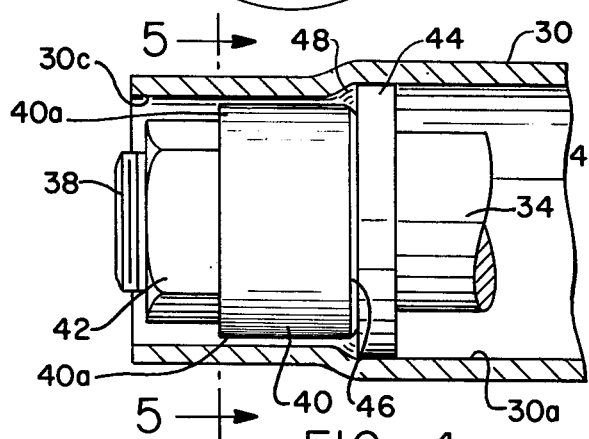
FIG.-4
FIG.-5

NON-REVERSIBLE BRAKE ADJUSTER

BACKGROUND OF THE INVENTION

This invention generally pertains to disc brake systems and more particularly to a brake adjuster for maintaining a constant clearance between members of a multiple disc stack such that brake pedal travel and force are substantially consistent with braking effort irrespective of wear experienced by the members of the brake stack. Various types and configurations of adjusters have been proposed and are within the prior art and these generally function to vary the retracted position of a brake pressure plate so that the brake friction members maintain a constant relative clearance notwithstanding a diminishing width due to wear of the members. A particular brake adjuster of the type alluded to is described in application Ser. No. 933,338 filed Aug. 14, 1978 and now issued to U.S. Pat. No. 4,192,407 to Richard L. Crossman and assigned to Goodyear Aerospace Corporation, Akron, Ohio. The brake adjuster of the referenced patent comprises a return pin which passes through a deformable tubular member and is attached at one end to the pressure plate and at the opposite end to a swage having a configuration different from that of the tubular member. When compensation for brake wear is required, the swage is drawn through the bore of the tubular member and deforms the tube so that it conforms to the shape of the swage. The present invention is an improvement in the state of the art and over the brake adjuster of U.S. Pat. No. 4,192,407 in that it provides a solution to problems arising out of situations when reverse loading is imposed on the adjuster.

SUMMARY OF THE INVENTION

An aspect of the present invention is to provide an automatic adjuster for disc brakes of the deformable tube type wherein the adjuster is non-reversible when subjected to reverse loading. The non-reversibility of the adjuster is accomplished without drastically changing the original configuration of the adjuster assembly and therefore without any substantial increase in cost.

In this respect, the various aspects and advantages of the invention are accomplished in an improved non-reversible brake adjuster comprising a pin interconnecting a brake pressure plate at one end and a metal swage at the opposite end and oriented within a deformable tube such as to radially deform the tube to the shape of the swage as said swage moves into the bore of the tube in response to brake wear, the improvement comprising means mounted on the pin relative to the swage and having the circumferential geometric configuration of the tube bore to move easily in the bore in the swaging direction but prevented from movement in the reverse direction by the deformed portion of the tube to therefore prevent the pin and swage from reversing direction due to loading on the pin in that direction.

In another aspect of the invention the pin is characterized by an increased diameter, the diameter being slightly less than the diameter of the tube bore and stepped down at the leading edge of the swage such that upon being subjected to reverse loading the trailing edge of the pin at the swage interface coacts with the deformed portion of the tube to prevent motion in the reverse direction.

BRIEF DESCRIPTION OF THE DRAWINGS

FIG. 1 is a sectional elevational view of a brake adjuster modified in accordance with the teaching of this invention;

FIG. 2 is a greatly enlarged end elevational view of the swage, tube, and pin assembly shown in FIG. 1;

FIG. 3 is an end elevational view similar to FIG. 2 illustrating the swage-tube relationship when adjusted to compensate for brake wear;

FIG. 4 is a side elevational view partially in section of the assembly shown in FIG. 3;

FIG. 5 is an end elevational view partially in section as taken on line 5—5 of FIG. 4;

DETAILED DESCRIPTION OF THE INVENTION

Figure 6:
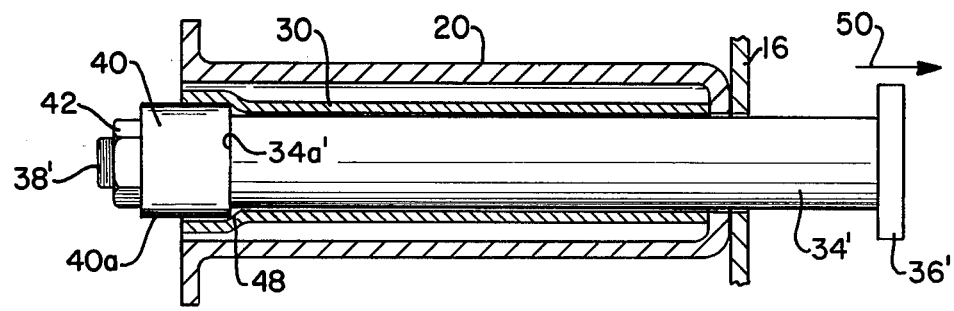
FIG. 6 is a side elevational view partially in section showing a portion of a brake adjuster assembly and illustrating a second embodiment of the invention.

Referring to the drawing and with particular reference to FIG. 1, numeral 10 generally designates a brake adjuster assembly in accordance with the present invention. The assembly 10 is conventionally interconnected between a brake pressure plate 12 (shown in ghost lines) and a brake housing 14, the pressure plate 12 being associated with a brake disc stack (not shown) in the usual manner of multiple disc brake systems. A brake adjuster casing generally indicated at 16 is secured to the brake housing 14 and defines a bore 16' that is open at one end 16a and substantially closed at the opposite end 16b, the closed end being in a relative closer position to the brake pressure plate than the open end and the casing axis z—z being substantially perpendicular to the pressure plate 12. The casing 16 carries a spring 18 and a spring follower 20 within the bore 16', which spring 18 is in cooperative engagement with said follower 20 for motion along the z—z axis. The follower 20 has a shoulder 22 positioned relative to the closed end 16b of the casing and is further characterized by a flange 24 positioned relative to the open end 16a, said spring 18 acting against the flange 24 and the closed end 16b to resist motion of the flange 24 in the direction of arrow 26. Movement of the spring follower 20 within the casing 16 is under control of pressure applied to the pressure plate 12 and the force of the spring 18, the distance of such movement being equal to a distance "x" and defined as the built-in clearance between the discs of the brake stack. The distance "x" of the follower motion is limited at the open end 16a by an annular snap ring or washer 28 and at the opposite end 16b by the wall of the casing 16. Thus, the distance "x" is that amount which must be taken up in the brake adjuster 10 by means of brake pressure applied to the pressure plate 12 before compensation for wear may be made and effective braking force applied to the brake disc stack. It will, of course be appreciated that the brake adjuster assembly as shown in FIG. 1 is in the brake actuated position and thus when the brake pressure is released, the spring 18 returns the spring follower 20 to a point where the flange 24 abuts the annular washer 28. The brake discs then separate by an aggregate equal to the gap "x".

Coaxially mounted within the spring follower tube 20 and having a substantially equal length is a metal tube 30 having one end 32a in abutting relationship with the shoulder 22 of the follower 20 and an opposite end 32b in a relative position to abut the washer 28 when the brake is in the release position. Received coaxially within the tube 30 is a pin 34 having a head end 36 adapted to be connected to the pressure plate 12 in any conventional manner. The pin 34 passes through an opening 16c in the end of the casing 16 and terminates in a threaded end portion 38 at the open end 16a of the casing 16. The threaded portion 38 receives a swage 40 thereon that may be locked on the pin by any various methods. FIG. 1 shows a lock nut 42 that may accomplish this purpose. As shown in FIGS. 2 and 3 the swage 40 is preferrably of a substantially square shape having rounded corners 40a so as to "wedge" its way into the bore 30a of the tube 30. Thus, in response to compensation for brake disc wear, the swage moves into the bore 30a and deforms the tube from its original round tubular shape to a substantially square configuration approximating that of the outer perimeter of the swage. FIG. 2 illustrates the swage/tube relationship prior to deforming while FIG. 3 shows the relationship after the swage 40 deforms the tube 30. As shown, the tube walls at 30b are forced outwardly by the swage corners 40a which effect a corresponding inwardly deformation of the tube wall between the swage corners at 30c.

The above described brake adjuster is the subject of U.S. Pat. No. 4,192,407 which reference also provides a more detailed discussion with respect to various parameters affecting operation of the adjuster.

Now therefore, it will be appreciated that the above-described brake adjuster suffers in situations where reverse loading is experienced. Such reverse loading may be of sufficient magnitude to overcome the frictional forces holding the square swage in the tube bore 30a. This invention provides a unique solution to the problem by the provision of means for locking the swage 40 in the tube bore 30a. Such means may firstly be in the form of a circular washer 44 positioned adjacent the leading edge 46 of the swage 40 as shown in FIGS. 1, 4, and 5. The washer 44 has a diameter that is substantially that of the bore 30a and it therefore follows the bore when brake wear compensation is effected. As clearly evident from a consideration of FIGS. 4 and 5, once the swage 40 moves into the tube bore 30a and deforms it to a substantially square configuration it may not be reversed in direction because of an interference between the circular washer 44 and the reshaped tube at those areas designated 48 in the drawing. Positioning of the washer 44 adjacent the leading edge of the swage is considered preferred inasmuch as the least amount of slippage motion in the reverse direction is available due to the very close proximity of the washer to the deformed edge 48 of the tube 30.

Figure 7:
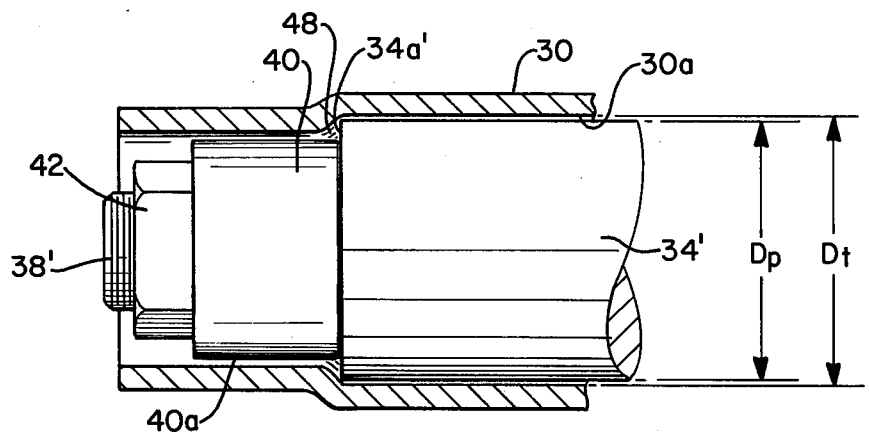
FIG. 7 is a greatly enlarged elevational view similar to that of FIG. 4 illustrating the embodiment of FIG. 6.

FIGS. 6 and 7 illustrate a second embodiment of the invention wherein a pin 34' is characterized by an increased diameter $D_p$ that is approximately but not equal to the diameter $D_t$ of the tube bore 30a. In this circumstance, the pin is stepped down to the threaded portion 38' for receiving the swage 40 and nut 42 thereon. The pin and swage thus move in the swaging direction of arrow 50 but are prevented to move in the opposite direction by reason of the trailing edge 34a' of the pin 34' abutting the deformed areas of the tube at 48. In this embodiment the relative diameters of the pin 34', deformable tube 30, and swage 40 may be optimized for weight and space considerations.

Figure 8:
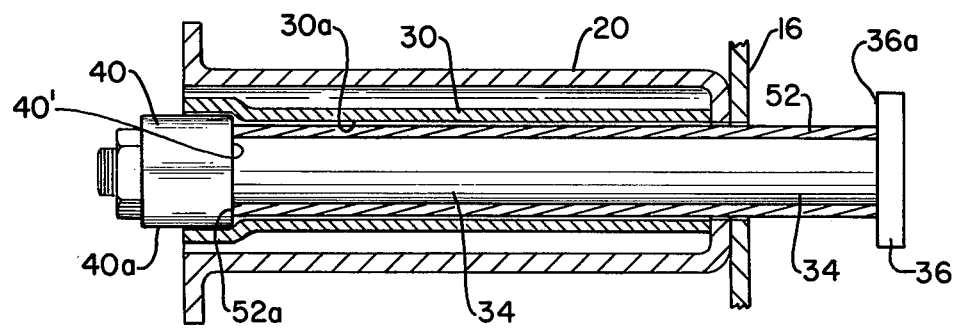
FIG. 8 is a side elevational view partially in section showing a portion of a brake adjuster assembly and illustrating still another embodiment of the invention.

In FIG. 8 the pin 34 may carry a tubular member 52 having an O.D. substantially but not equal to the I.D. of the deformable tube 30. In this circumstance the tube 52 will have a length equal to the length of the pin 34 as measured from the leading edge 40' of the swage 40 to the trailing edge 36a of the pin head 36. In operation, the swage 40 will be drawn into the tube bore 30a and deform the tube 30 and upon experiencing a reverse load effect will be prevented from moving in the direction of the reverse load by the sleeve tube trailing edge 52a abutting the deformed edges 48 of the tube 30.

While certain representative embodiments and details have been shown for the purpose of illustrating the invention, it will be apparent to those skilled in the art that various changes and modifications may be made therein without departing from the spirit or scope of the invention.

What is claimed is:

1. An improvement in disc brake assemblies including automatic adjusting apparatus to compensate for brake wear, said adjusting apparatus including pin means interconnecting a brake pressure plate at one end and a metal swaging device at the opposite end and oriented axially within a deformable tube such as to radially deform the tube to the shape of the swaging device as the device moves into the bore of the tube in response to brake wear, the improvement comprising means cooperating with said pin and positioned relative to the swaging device within the tube to move easily with the pin and swaging device in the swaging direction but which prevents movement in the reverse direction by reason of the deformed shape of the tube.

2. The improved brake adjusting apparatus as set forth in claim 1 wherein the tube is circular, the swaging device is square and the means preventing pin movement in the reverse direction comprises a circular washer having a diameter substantially but not equal to the diameter of the tube bore.

3. The improved brake adjusting apparatus as set forth in claim 2 wherein the washer is adjacent a leading edge of the swaging device so as to provide the least amount of slippage in the reverse direction before being stopped by the deformed shape of the tube.

4. The improved brake adjusting apparatus as set forth in claim 3 wherein the pin has a threaded end for receiving a threaded swaging device thereon and said threaded end is of a smaller diameter than the remainder of the pin so as to define a shoulder at the termination of the threads, said washer being positioned and retained on the pin between the shoulder and the swaging device.

5. The improved brake adjusting apparatus as set forth in claim 4 wherein the washer is threaded onto the pin to the point of the shoulder.

6. The improved brake adjusting apparatus as set forth in claim 1 wherein the tube is circular, the swaging device is square, and the means preventing pin movement in the reverse direction comprises a sleeve tube mounted coaxially on the pin and having an O.D. substantially but not equal to the I.D. of the deformable tube.

7. The improved brake adjusting apparatus as set forth in claim 6 wherein the length of the sleeve tube is equal to the length of the pin between the swaging device and the pressure plate.

8. An improvement in disc brake assemblies including automatic adjusting apparatus to compensate for brake wear, said adjusting apparatus including pin means interconnecting a brake pressure plate at one end and a metal swaging device at the opposite end and oriented axially within a deformable tube such as to radially deform the tube to the shape of the swaging device as the device moves into the bore of the tube in response to brake wear, the improvement comprising pin means having an O.D. substantially but not equal to the I.D. of a tubular deformable tube throughout its length except for a stepped down portion at its trailing end having the swaging device mounted thereon, said pin capable of movement in the swaging direction but prevented from movement in the opposite direction by reason of the deformed shape of the tube.

* * * * *